United States Patent
Nicol

(10) Patent No.: US 7,744,108 B2
(45) Date of Patent: Jun. 29, 2010

(54) STEM FRONT CAP

(76) Inventor: Morgan Nicol, Via Cantonale 2, CH-6917, Barbengo (CH)

( * ) Notice: Subject to any disclaimer, the term of this patent is extended or adjusted under 35 U.S.C. 154(b) by 0 days.

(21) Appl. No.: 11/607,139

(22) Filed: Nov. 30, 2006

(65) Prior Publication Data

US 2007/0222176 A1 Sep. 27, 2007

(30) Foreign Application Priority Data

Mar. 7, 2006 (DE) .................. 10 2006 010 817

(51) Int. Cl.
*B62K 19/00* (2006.01)

(52) U.S. Cl. .................. 280/279; 280/274; 74/551.1; 74/551.3; 74/551.8

(58) Field of Classification Search ........... 280/279, 280/274; 74/551.1–551.8
See application file for complete search history.

(56) References Cited

U.S. PATENT DOCUMENTS

| | | | | |
|---|---|---|---|---|
| 4,682,509 A | * | 7/1987 | Takamiya et al. | 74/551.4 |
| 5,737,967 A | * | 4/1998 | Hartley | 74/551.3 |
| 6,920,806 B2 | * | 7/2005 | Cutsforth | 74/551.8 |
| 6,945,136 B2 | * | 9/2005 | Nielsen | 74/551.5 |
| 7,127,966 B2 | * | 10/2006 | Meng | 74/551.8 |
| 2004/0060382 A1 | * | 4/2004 | McColligan et al. | 74/551.8 |
| 2005/0044981 A1 | * | 3/2005 | Huang | 74/551.8 |
| 2005/0268743 A1 | * | 12/2005 | Meng | 74/551.8 |
| 2006/0162482 A1 | * | 7/2006 | Okajima et al. | 74/551.1 |
| 2007/0151403 A1 | * | 7/2007 | Andrews et al. | 74/551.1 |

* cited by examiner

*Primary Examiner*—Lesley Morris
*Assistant Examiner*—Tashiana Adams
(74) *Attorney, Agent, or Firm*—Greer, Burns & Crain, Ltd.

(57) ABSTRACT

A stem front cap for the stem of a bicycle, including: a body having a mounting part that is adapted and structured for receiving and securing a handlebar in conjunction with a stem. A receiving section at the body of the stem front cap is provided for receiving and securing at least one aero support to enable the user to assume an aerodynamic operating posture on a bicycle.

18 Claims, 3 Drawing Sheets

STEM FRONT CAP

BACKGROUND

The present invention relates to a front cap for a stem and to a bicycle stem equipped with such a front cap for fastening a handlebar to a bicycle. In the prior art, caps for stems have become known having a half-cylindrical recess for the cap to form-fit and to be securely attached to a bicycle handlebar.

In competitive cycling, wind resistance is a crucial factor. This holds in particular for triathlon racing where rules disallow drafting such that wind resistance is highly significant.

Measures to reduce wind resistance include in general a streamlined shape of bicycle components on the one hand and on the other hand an optimum riding posture so as to minimize the frontal area. Many cyclists use so-called aero supports which are attached to the handlebar. In addition to aero supports, arm or elbow rests are often provided as a support for the rider to prop his forearms on. The rider can concurrently grip front portions of the aero supports with his hands. This will result in the rider assuming a flat riding posture which will minimize wind resistance.

The pair of aero supports may be designed as separate bars, e.g. terminate bar end-like or they may be joined in front to form a bow. Aero supports are typically mounted at a relatively narrow lateral distance such that in operation the rider will offer a particularly small frontal area.

Handlebars have become known having one-piece, integral aero supports. Typically the handlebar will extend conventionally outwardly from the point of attachment to the stem, the tubes will then bend forwardly from the side edges, approaching one another again to extend forwardly to form approximately parallel aero supports.

The front ends of the aero supports may for example be joined to form a bow. The lateral distance of the two aero supports is narrow, being for example about half the maximum handlebar width. The radii required for bending forwardly require a long tube for the handlebar which therefore has a relatively large weight.

Also, a type of aero supports have become known that attach directly to the handlebar by means of fittings. For this purpose, clamping units may be attached to the handlebar to secure the aero supports to the handlebar.

A fundamental disadvantage in using such clamping units with handlebars is that most of the handlebars are not designed to cope with the heavy stresses and strains. The risk that the handlebar breaks may thus increase which may lead to serious accidents. There is the further disadvantage that the clamping units will optically deface the handlebars.

Then again, if the handlebar were designed for the added stresses by clamping units fastened directly to the handlebar, or if the receiving elements are designed integrally with the handlebar, such handlebar will be heavy in weight even if the user removes the aero supports.

Yet another disadvantage is that the clamping units for securing the aero supports must be especially fitted for different cross-sectional shapes of the handlebars. Apart from standard handlebars having round cross-sections there are for example those being non-circular, e.g. oblate in profile achieve a lower wind resistance. This type of handlebars thus requires specially manufactured clamping elements.

It is therefore the object of the present invention to provide a stem front cap and a stem so as to allow a variable and uncomplicated and also safe use of aero supports.

SUMMARY

The stem front cap according to the present invention is provided for the stem of a bicycle. The stem front cap comprises a body having a mounting part that is adapted and structured for receiving and securing a handlebar in conjunction with a stem. At least one receiving section is provided for receiving and securing at least one aero support to allow the user of an accordingly equipped bicycle to assume an aerodynamically streamlined operating position.

The invention has many advantages. One considerable advantage among others is that the receiving section is provided directly at the stem front cap. The aero supports are fastened, not to the handlebar but to the specially designed stem front cap. Bicycles equipped such can be used with conventional handlebars without any additional reinforcements or the like.

A bicycle with a stem equipped with a conventional cap can be retrofitted with aero supports by simply substituting the stem front cap of the invention without adversely affecting reliability and safety.

The receiving section according to the invention is configured such as to safely withstand the stresses and strains by means of suitable materials and appropriate wall thickness. Thus all the requirements can be fulfilled at their optimum level.

With the stem front cap according to the invention attached, the stem as a whole will be optimally configured for receiving aero supports and supporting the weight. With the stem front cap removed and replaced with a conventional cap, the weight will be the lowest possible such that the conditions are optimal again.

The stem front cap according to the invention in particular provides for the receiving section to be configured at the stem front cap body. The bicycle handlebar is a separate element received in the stem.

The stem front cap according to the invention is preferably made of metal such as aluminum or titanium, or of a metal alloy. Also, the stem front cap may be manufactured of a fibrous composite material.

A preferred specific embodiment of the invention provides at least two receiving sections. The receiving section or sections may comprise one receiving element each. For example every receiving section may comprise at least one clamping unit. It is in particular preferred that one receiving element be designed as a clamping unit.

The configuration of the clamping unit may vary similarly to clamping units known from the prior art. At least one clamping unit is in particular configured to be or to include a tube clamp or the like. The clamping unit is preferably provided with a screwed connection or a number of screwed connections for the tube clamp to receive the tube-type aero support.

The clamping unit may be configured to be a slotted tube having a clamping flange. In this case the aero support is inserted into the slotted tube and clamped in by means of screws so as to be reliably secured.

Preferred specific embodiments comprise a stem front cap whose body comprises apertures configured as through holes or bores for receiving screws so as to secure the body to the stem while clamping a handlebar in position. The apertures are in particular provided in the mounting part. A configuration as bores allows thread cutting so as to enable screwed connections.

All of the embodiments allow the aero supports to be formed integrally with the body of the stem front cap. In this case, replacement of a conventional cap with the stem front cap of the invention will directly furnish the bicycle with aero supports. A compact though robust and lightweight structure is thus achieved.

Preferably the mounting part is centered at the body and in particular it is formed integrally with it.

All of the configurations of the stem front cap according to the invention preferably provide for one receiving section respectively disposed on each side of the mounting part. The receiving section may be disposed above the mounting part. Thus the aero supports are in a raised position relative to the handlebar. The configuration may be inverted such that the receiving sections are provided at the level where the handlebar is received in the mounting part.

Preferably at least one retaining unit is provided for receiving at least one supporting element to support the forearms or the elbows of the cyclist. Two or more supporting elements disposed at the retaining units are in particular provided. The lateral distance between the supporting elements is in particular variable. The retaining units may for example be provided with ridges or grooves or the like into which lugs on the supporting elements extend so as to be secured laterally. With the supporting elements additionally screwed onto the retaining units, attachment will be secure. Riding comfort can be enhanced by using soft materials for the supporting elements.

All of the configurations provide a central axis of the retaining unit to be inclined with respect to a longitudinal stem front cap by preferably between 30° and 75° and in particular 60°. The longitudinal axis will correspond to the longitudinal axis of the ready-to-use bicycle. The longitudinal axis is also the axis of symmetry since the right and left halves of the stem front cap are configured to be mirror-symmetrical.

Preferably the stem front cap is configured to be aerodynamic as a whole. Preferably the front portion of the mounting part in particular is nose-shaped while the rear portion is configured to receive a handlebar. The overall result is an aerodynamic configuration.

The handlebar stem according to the invention for a bicycle comprises a stem rod or a stem body, and a stem front cap. One or the mounting part is provided for receiving and securing a handlebar. At least one receiving section at the stem front cap serves to receive and secure at least one aero support to allow the user to assume an aerodynamically streamlined operating position on a bicycle thus equipped.

The invention is configured such that the rider of a bicycle equipped accordingly may assume a comfortable pose in an aerodynamic operating position where the wind resistance will be low. If desired, the rider may prop his forearms on supports so as to rest his arms during riding. This is in particular advantageous in triathlons when competitors mount their bicycles after the swimming stage.

BRIEF DESCRIPTION OF THE DRAWINGS

Further features, characteristics and advantages of the present invention can be taken from the following description of the embodiments with reference to the attached drawings.

DETAILED DESCRIPTION OF THE PREFERRED EMBODIMENTS

Figure 1:
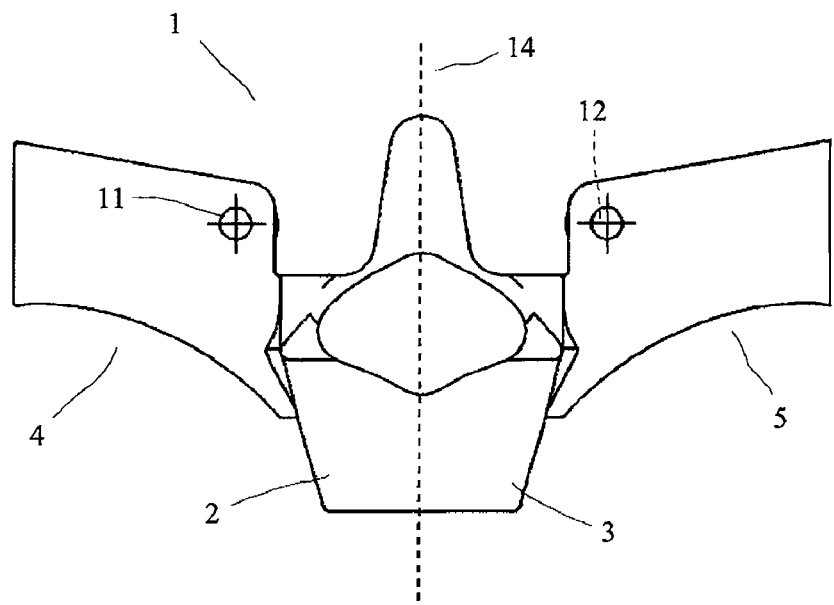
FIG. 1 is a top view of a stem front cap according to the present invention.

The FIGS. 1 through 4 illustrate a first embodiment of the stem front cap 1 according to the invention.

The stem front cap 1 substantially consists of a body 2 which in this case is formed integrally. The central portion has a mounting part 3 or a mounting element 3 provided on it that serves to partially receive the handlebar (not shown). The mounting part 3 is an integral component of the stem front cap 1.

The handlebar is fixedly received in the stem front body 21 and in the stem front cap 1. To this purpose the mounting part 3 comprises an approximately half-cylindrical recess 19 that is configured to fit around the handlebar to be used.

The stem front cap 1 is structured to be mirror-symmetrical relative to the longitudinal axis 14 which extends centrally through the mounting part 3 and through the body 2. The longitudinal axis 14 extends parallel to the longitudinal extension of a bicycle thus equipped.

To the right and left of the longitudinal axis 14, receiving sections 4 and 5 are provided which may serve to fasten aero supports 20 to. The receiving sections 4 and 5 comprise receiving elements 6 and 7 which in this case are configured as clamping units 8 and 9. To clamp the aero supports 20 in place, screws are inserted from below into the apertures 11 and 12 and screwed directly into threads 11a and 12a.

Other embodiments may provide through bolts in the bores 11 and 12 that are connected with separate nuts. All of the cases preferably provide recesses 11b and 12b for receiving the screw or bolt heads.

Figure 2:
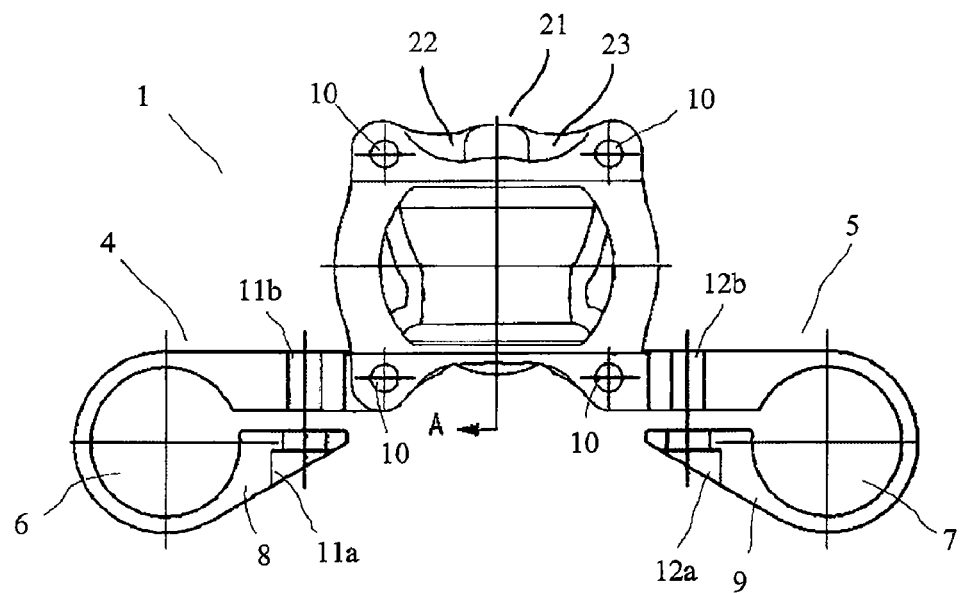
FIG. 2 is a back view of the stem front cap according to FIG. 1.

FIG. 2 illustrates a rear view of the stem front cap 1 according to the invention. The four bores 10 in the mounting part or the mounting element 3 can be seen, each of which may be screw-tapped. Typically, however, the bores 10 are configured to be through bores into which screws are inserted from the front 17 and passing through so as to connect the stem front cap 1 with the body of the stem front body, which is not shown.

An upper end of the mounting element 3 has a generally centrally located tongue-shaped formation 21 surrounded on at least two sides by recesses 22, 23.

The mounting elements of the receiving sections 4 and 5 and their wall thickness are configured such that the stem front cap 1 can withstand the stresses and strains. The small distances allow to keep the weight low while providing high stressability.

Figure 3:
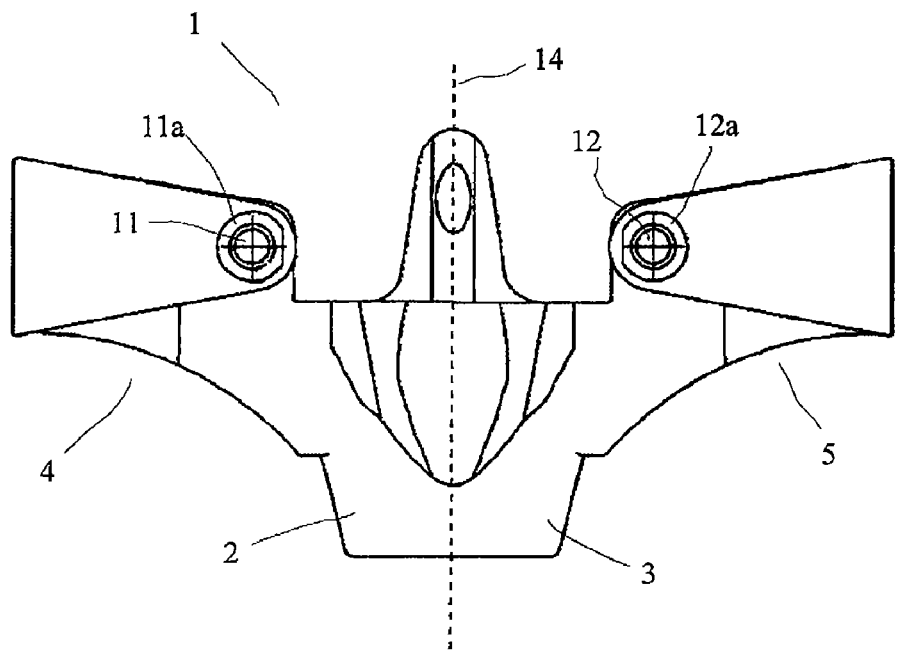
FIG. 3 is a bottom view of the stem front cap according to FIG. 1.

FIG. 3 is a bottom view showing the recesses 11b and 12b of the screw receiving elements or bores 11 and 12.

Figure 4:
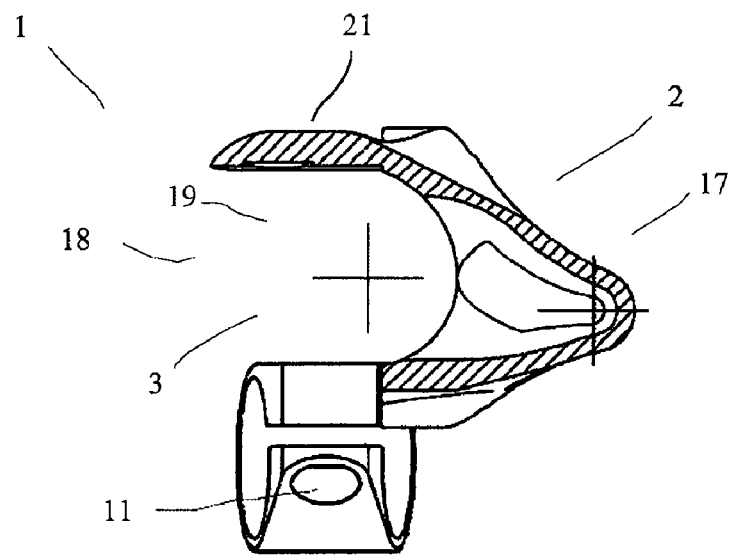
FIG. 4 is a sectional side view of the stem front cap according to FIG. 1.

FIG. 4 is a sectional side view of the aerodynamic cross-section of the stem front cap 1 according to the invention. The nose-type shape is tapering toward the front end 17 while the recess 19 is provided in the rear portion 18 for receiving a handlebar. Furthermore a convex extension projects away from the end of the stem and forms the recess (19). The nose-shaped extension projects from the convex extension.

The stem front cap 1 according to the invention attaches to virtually any bicycle. All that needs to be done is to remove the existing stem front cap and replace it with a stem front cap according to the invention. To accommodate different stems, stem front caps may be provided in different dimensions. For example the distance between the bores 10 may be variable.

It is also feasible to provide differently shaped recesses 19 in the mounting part 3 to accommodate differently configured handlebars.

The front portion 17 of the stem front cap 1 is aerodynamically shaped, in this case as a nose. This will lower drag.

The present invention allows a flexible application of aero supports 20. As and when required, a stem front cap according to the invention may be mounted so as to allow a stable and safe operation with aero supports.

Figure 5:
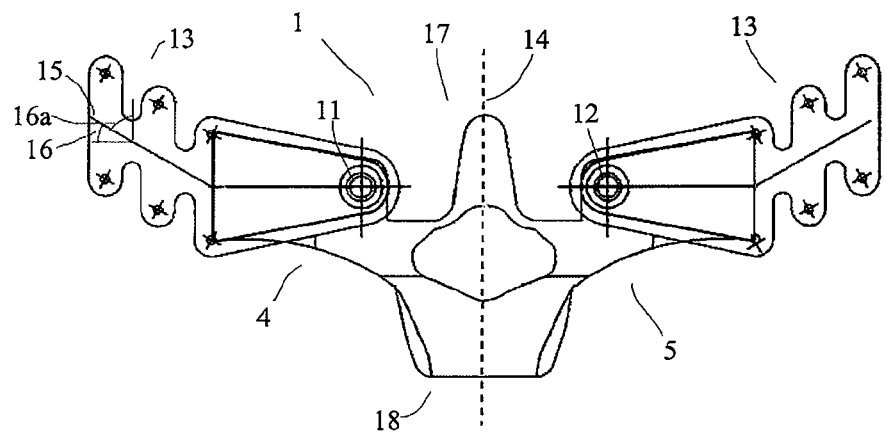
FIG. 5 is a top view of a further embodiment of a stem front cap according to the present invention.
Figure 6:
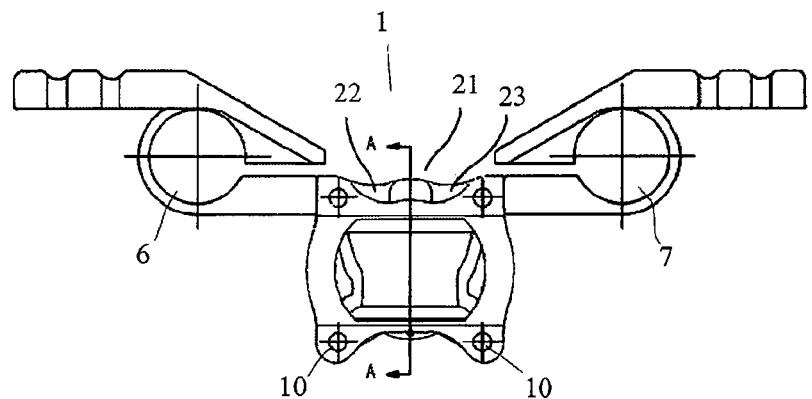
FIG. 6 is a back view of the stem front cap according to FIG. 5.
Figure 7:
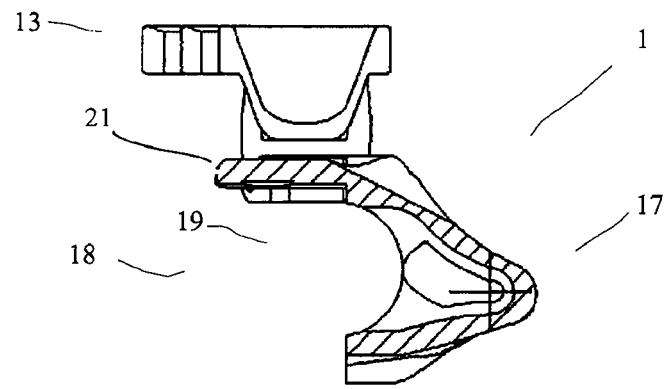
FIG. 7 is a sectional side view of the stem front cap according to FIG. 5.

The FIGS. 5 to 7 illustrate another embodiment. To facilitate readability, like or similar parts and components have the same reference numerals.

The stem front cap 1 illustrated in FIGS. 5 through 7 also includes receiving elements 6 and 7 provided at the receiving sections 4 and 5 to which the aero supports 20 can be firmly attached.

The two receiving sections 4 and 5 are followed by retaining units 13 to which support members such as arm support pads or arm rest cups or the like can be attached. This allows the rider to rest his forearms or elbows on the support members received in the retaining units 13. This will lower the wind resistance and the rider can rest his arms.

To enable flexible width adjustment, a number of retaining units 13 can be provided at different lateral distances such that the width is variable.

The retaining units 13 are disposed at both sides on respective platforms whose central axis 15 is set at an angle 16 relative to the transverse direction. The present angle 16a to the longitudinal direction is approximately 60°.

The stem front cap 1 according to the invention can be used with any shape of handlebar, in particular with aerodynamically shaped types. The handlebar cross-section in the region of the aero supports is not critical for mounting the aero supports since said aero supports are not clamped onto the handlebar but mounted to the stem front cap. This leads to considerably increased flexibility.

Another advantage is that handlebars or the like can now be configured without considering whether aero supports should be accommodated. These components are free to be designed exclusively with aerodynamics and design features in mind.

The invention claimed is:

1. A stem front cap configured for mounting on an end of a stem of a bicycle, comprising: a stem front cap body with a mounting part that is adapted and structured for receiving and securing a handle bar in conjunction with the stem, a convex extension projecting away from the end of the stem, and a generally nose-shaped extension: projecting from said convex extension; and at least one receiving section at the stem front cap body having at least one clamping unit at the stem front cap body for receiving and securing at least one aero support to the stem front cap body so as to enable the user to assume an aerodynamic operating position on a bicycle.

2. The stem front cap according to claim 1, wherein two receiving sections are provided.

3. The stem front cap according to claim 1, wherein said at least one receiving section comprises at least one receiving element.

4. The stem front cap according to claim 1, wherein the mounting part is arranged centered at the body.

5. The stem front cap according to claim 1, wherein on each side of the mounting part said at least one receiving section is provided, respectively.

6. The stem front cap according to claim 1, wherein at least one retaining unit is provided for receiving at least one supporting element for supporting the arms of a rider.

7. The stem front cap according to claim 1, wherein two supporting elements are provided that are arranged at the retaining units.

8. The stem front cap according to claim 6, wherein the lateral distance of the at least one supporting element is variable.

9. The stem front cap according to claim 6, wherein a central axis of the retaining unit is inclined between 30° and 75° with respect to the longitudinal axis of the body.

10. A handlebar stem for a bicycle comprising: a stem body and a stem front cap configured for mounting on an end of the stem; a mounting part for receiving and securing a handlebar; a convex extension projecting away from the end of the stem, a generally nose-shaped extension: projecting from said convex extension; and at least one receiving section at the stem front cap having at least one clamping unit for receiving and securing at least one aero support to the front cap for enabling the rider to assume an aerodynamic operating position.

11. The stem front cap according to claim 10, wherein said at least one receiving section forms a generally circular opening configured for receiving the at least one aero support.

12. A stem front cap configured for mounting on an end of a stem of a bicycle, comprising: a stem front cap body with a mounting part that is adapted and structured for receiving and securing a handle bar in conjunction with the stem, a convex extension projecting away from the end of the stem, and a generally nose-shaped extension: projecting from said convex extension; at least one receiving section at the stem front cap body having at least one clamping unit at the stem front cap body for receiving and securing at least one aero support to the stem front cap body so as to enable the user to assume an aerodynamic operating position on a bicycle; and an aero support integrally formed with the stem front cap body.

13. The stem front cap of claim 1 wherein said mounting part includes a generally half-cylindrical recess configured for receiving the handle bar.

14. The stem front cap of claim 10 wherein said mounting part includes a generally half-cylindrical recess configured for receiving the handle bar.

15. The stem front cap of claim 1 wherein said generally nose-shaped extension: extends beyond said convex extension.

16. The stem front cap of claim 12 wherein said generally wedge-shaped extension: extends beyond said convex extension.

17. The stem front cap of claim 1 wherein said generally nose-shaped extension: extends beyond said at least one receiving section.

18. The stem front cap of claim 10 wherein said generally nose-shaped extension: extends beyond said at least one receiving section.

* * * * *